(No Model.)
A. CAMPBELL.
MECHANISM FOR OPERATING THE BEDS OF PRINTING PRESSES.
No. 274,560. Patented Mar. 27, 1883.
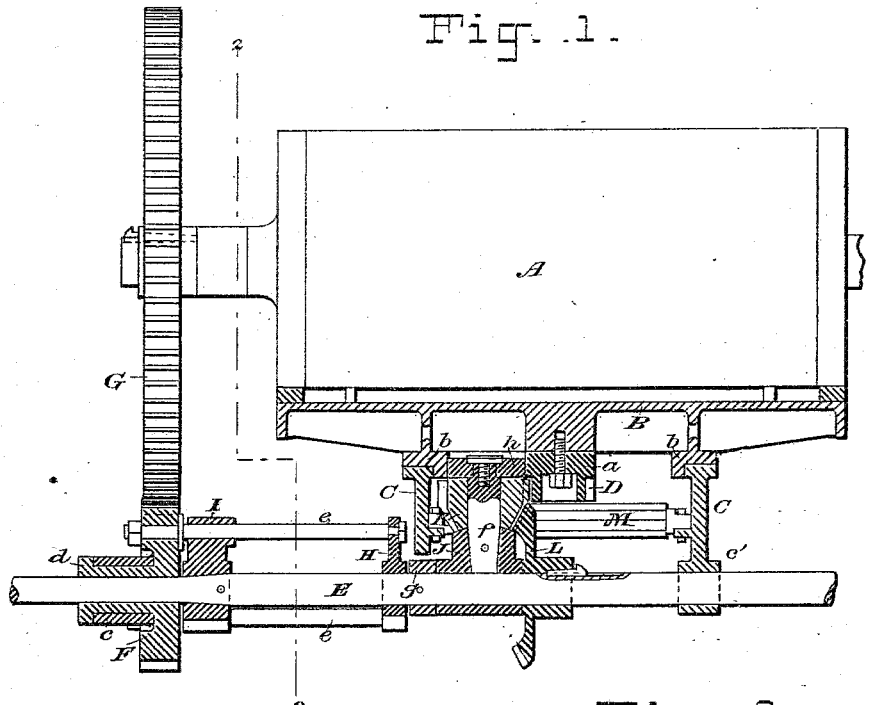
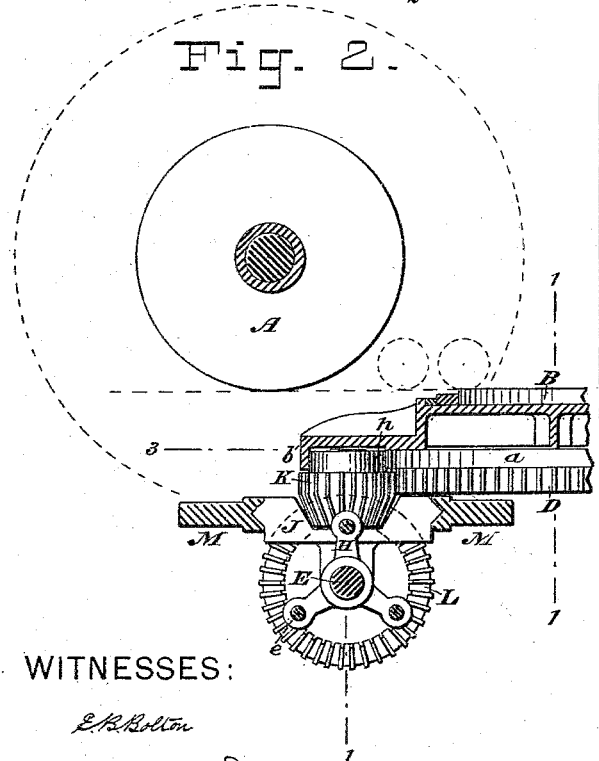
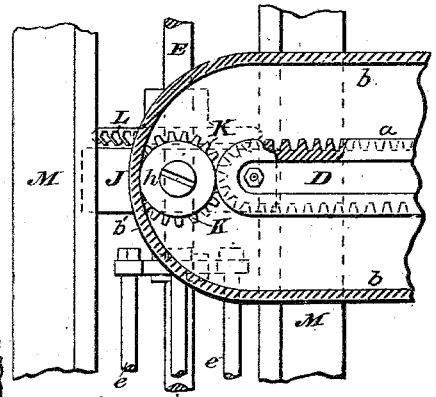
WITNESSES:
INVENTOR:
Andrew Campbell
By his Attorneys,
Burke, Fraser & Connett

UNITED STATES PATENT OFFICE.

ANDREW CAMPBELL, OF BROOKLYN, ASSIGNOR TO JOHN McLOUGHLIN AND EDMUND McLOUGHLIN, OF NEW YORK, N. Y.

MECHANISM FOR OPERATING THE BEDS OF PRINTING-PRESSES.

SPECIFICATION forming part of Letters Patent No. 274,560, dated March 27, 1883.

Application filed June 21, 1882. (No model.)

*To all whom it may concern:*

Be it known that I, ANDREW CAMPBELL, a citizen of the United States, residing at Brooklyn, Kings county, New York, have invented certain Improvements in Mechanisms for Operating the Beds of Printing-Presses, of which the following is a specification.

In the earliest power printing-presses the bed was given an alternate reciprocating motion through the medium of an endless rack on the bed and a constantly-revolving pinion mounted relatively on the upper end of a fixed vertical shaft arranged under the center of the press. In order to enable the pinion to mesh alternately with the faces of the rack, the rack was mounted to slide sidewise transversely of or across the bed in suitable bearings. The motion of the rack was determined by causing a roller on the upper end of the pinion-shaft to engage a recess or grooved track around the rack and concentric to its pitch-line. This upright pinion-shaft was driven from the cylinder by suitable mechanism, whereby the bed and cylinder were caused to move in unison. By this means rotary motion of the pinion was converted into alternate reciprocatory motion of the bed.

My present invention belongs to this class of presses, and its object is to reciprocate the bed of the press; but I seek to obviate certain difficulties inherent in the old construction, which difficulties I will now describe. The excessive width between the tracks on which the bed moved, owing to the space required for the shifting rack and its accessories, was a serious objection. To make the bed strong enough to bear the impression, it was made very heavy, and the mechanism to actuate it was also proportionately heavy. The speed was also necessarily reduced, owing to the difficulty in checking the momentum, and the press was also proportionately costly. To overcome these defects and produce a press that will be cheaper, lighter, and capable of being run with greater speed, I have reversed the arrangement of the rack and pinion from that formerly used, and employ a fixed rack with the faces of its teeth arranged at right angles to the face of the bed, and a shifting pinion mounted to move with its axis always parallel with the faces of the rack-teeth. This enables me to relieve the bed of the accessories of the moving rack, and to bring the bearings upon which the bed moves closer together and in the proper place to secure a firm impression.

In the drawings, which serve to illustrate my invention, Figure 1 is a vertical transverse section, cut substantially in the two planes indicated by the lines 1 1 in Fig. 2, of a portion of a cylinder-press. Fig. 2 is a vertical section at right angles to Fig. 1 and substantially on line 2 2 of the latter figure. Fig. 3 is a horizontal section taken on line 3 3 in Fig. 2.

I have only shown parts of the printing-press—namely, those portions which operate in connection with the bed-actuating mechanism.

A is the cylinder; B, the reciprocating bed bearing the form, and C C the bearers or tracks on which the bed plays.

D is an endless rack in the nature of a flattened toothed wheel, the ends being semicircular, as shown in Fig. 3. This rack has a smooth face, *a*, all around, which extends out flush with the faces of the teeth, and it is securely fixed to the under side of the bed B, extending longitudinally along its center, as shown. The bed is provided with flanged slides *b b*, which rest on the bearers C C.

E is a shaft mounted rotatively in bearings *c c'*. This shaft is free to move endwise in its bearings, and on it is loosely mounted a toothed wheel, F, provided with a sleeve-like boss, *d*, which rests in and is retained in the bearing *c*. This boss is in the nature of a bush for the shaft E, and the wheel F is kept in place by the flange on the end of its boss. The wheel F meshes with a toothed spur-wheel, G, on the shaft of the printing-cylinder, and is driven thereby. The wheel F is made to drive the shaft E and yet allow it to move endwise by means of the following-described mechanism:

H is a spider mounted loosely on shaft E, with arms—three in this case—which are rigidly connected with wheel F by guide-rods *e e*, arranged parallel to shaft E. On shaft E is fixed a spider, I, with arms, through which the rods *e* pass. This spider moves freely on said rods *e* when the shaft plays endwise. As a modification of this device, a drum or cylinder may be substituted for the rods e, and the spider I be made to play in this drum on ribs or splines. In this case the projecting end of shaft E, beyond the sliding head I, could be cut off.

J is a carrier for the pinion K, which drives the bed. This carrier is mounted loosely but snugly on the shaft E, which is capable of rotating freely within the said carrier. The pinion K is mounted rotatively on a stud, f, fixed in or forming part of the carrier J, and has a lower beveled portion, the teeth of which are continuous with those above, and which mesh with teeth on a spur bevel-wheel, L, securely fixed on the shaft E. The carrier J is embraced between the boss of said wheel L and a fixed collar, g, on the shaft.

Referring now to Fig. 2 most particularly, M M are transversely-arranged guides or guide-bearers fixed between the bearers C, close under the rack D, and provided with grooves in their inner faces to receive correspondingly-shaped tongues on the sides of the carrier J. These guide the double pinion K in its transverse movement in passing around the end of the rack. To keep the pinion in mesh with the rack, a wheel, n, is mounted to rotate on the upper extremity of the stud f, and made to fit snugly between the face a of the rack and the inner faces of the flanged slides b on the bed. Where the pinion passes around the ends of the rack, the flanges (here lettered b') on the slides are carried around in circles concentric with the circular ends of the rack, as shown best in Fig. 3. This circular end portion of the flange may be cast separately and fixed to the bed.

The operation is as follows: The relative proportions of the wheels F, G, K, and L being such as will give the bed a speed equal to that of the periphery of the cylinder, the said cylinder, when set in motion, imparts rotary motion to the pinion K through the wheels G and F, rods e, spider I, and bevel-wheel L. The pinion imparts a longitudinal motion to the bed B through the rack D. As the pinion nears the end of the rack it engages the teeth in the circular end of the same and rolls around the end of the rack, displacing the bed longitudinally far enough to pass, and moving itself transversely of the bed by sliding the shaft E and its attachments lengthwise. After the pinion has passed the longitudinal axis of the rack—that is to say, the position shown in Fig. 3—it begins to move the bed back again by engagement with the other side of the rack. Thus a continuous rotary motion of the pinion imparts an alternate reciprocatory motion to the bed.

In the former constructions, where the rack was arranged to move sidewise laterally on the bed, and the pinion was fixed in one position, the pinion was required to shift a long rack sidewise by engaging teeth at its extreme ends. This involved an enormous side draft, which was thrown onto the pinion at the same time that it was required to overcome the inertia and start the bed to moving in the opposite direction, necessitating very long guides for the rack to play on and a very strong construction in all of the parts. By arranging the pinion to shift from side to side, with its guides close under the rack, I am enabled to avoid side draft and to make the parts much lighter. It will be seen that the wheel h forms a bearing just above the rack-teeth and the guides M a bearing just below, and the close-fitting bearing of the carrier on the sliding shaft forms another guide-bearing immediately below these. Thus the pinion is held firmly and steadily in position. The advantage arising from the construction of the pinion with the bevel-teeth and straight or rack teeth continuous is, that when the bed is moving back under the impression and the greatest strain is thrown on the teeth, the teeth of the rack are pressing against one side of the straight teeth of the pinion while the teeth of wheel L are pressing against the opposite side of the bevel-teeth. Consequently, being continuous, the teeth are stronger, and can only be broken by shearing them off at the point where the two opposing forces meet. Thus I am enabled to use a lighter pinion. When the bed is moving in the other direction, the impression is off and less strength is needed. This is why I arrange the wheel L to engage the pinion on the side shown—that is, on the side next the rack—when the bed is moving back under the impression.

I am aware that endless racks set up edgewise, with the faces of their teeth arranged substantially parallel to the face of the bed, and driven by pinions swinging vertically on a universal joint, have been employed. These racks, however, are not fixed directly to the bed, and produce a shaking motion in the latter. My invention employs a pinion whose axis in every position of the pinion is always vertical, and a rack fixed directly to the under side of the bed, with the faces of its teeth at right angles to the plane of the face of the bed.

I do not wish to limit myself to the precise construction of the mechanism herein shown, as it may be modified without materially departing from the spirit of my invention—as, for example, the shaft E need not be arranged to slide endwise if the wheel L and collar g were connected by a sleeve and splined on the shaft. This construction would dispense with the spiders H and I and rods e. In this case the wheel F would be fixed on the shaft in the usual way. In the construction shown the spiders H and I might be simple disks, and the wheel h be made quite small and be arranged to traverse a narrow groove or channel. The rack might also have internal instead of external teeth.

Having thus described my invention, I claim—

1. A mechanism for actuating the reciprocating bed of a printing-press, comprising an endless rack fixed to the under side of said bed, as shown, and a laterally-shifting pinion mounted on a vertical axis, and arranged to mesh with said rack, said pinion being arranged to shift across the track of the bed with its axis always vertical, and to be kept in mesh with the rack by means substantially as described.

2. A mechanism for actuating the reciprocating bed of a printing-press, comprising an endless rack fixed to the under side of the bed and parallel with its line of travel, with the faces of its teeth at right angles with the face of the bed, a pinion mounted on a vertical axis and arranged to mesh with said rack, and also arranged to move on guides at right angles with the line of travel of the bed, means for keeping the pinion in mesh with the rack, and means for communicating a rotary motion to the pinion from the printing-cylinder, all combined and arranged substantially as set forth.

3. As an intermediate for converting rotary into reciprocating motion, the double pinion K, arranged to turn freely on its stud and provided with spur-teeth and bevel-teeth, which are formed continuous, as described, in combination with the reciprocating rack on the bed, arranged to engage the spur-teeth on the pinion, and the driving bevel-wheel arranged to engage the bevel-teeth of the pinion, the teeth of said rack and driving-wheel being made to engage the pinion-teeth as near each other as possible, substantially as and for the purposes set forth.

4. The combination, with the printing-cylinder and reciprocating bed, of the rack fixed to said bed, as shown, the sliding shaft bearing the spur bevel-wheel, the said wheel, the carrier for the pinion, mounted to move in guides across the line of travel of the bed, the pinion mounted on the carrier and having two sets of teeth, one arranged to mesh with the rack and the other with the spur bevel-wheel, the set-collar on the shaft, the means for keeping the pinion engaged with the rack, and mechanism, substantially as described, for communicating rotary motion from the cylinder to the sliding shaft, substantially as set forth.

5. The combination of the pinion, the rack, the carrier, and the guides for the carrier, the latter being arranged directly under the rack in order that side draft may be avoided, substantially as set forth.

6. The combination, with the rack provided with a smooth face, $a$, and the semicircular guide-flanges $b'$ around the ends of the rack, of the pinion, the wheel $h$, the carrier J, and the guides M, all arranged substantially as set forth.

7. The combination, with the cylinder, bed, and rack, of the shifting double pinion having continuous teeth, and the bevel-wheel for driving the pinion, all arranged as shown, whereby the wheel which drives the pinion engages the latter on the same side as the rack when the impression is on the bed, for the purposes specified.

8. The combination of the cylinder A, bed B, provided with flanged slides $b$, bearers C, fixed rack D, shaft E, wheel F, spur-wheel G, spiders H and I, rods $e$, carrier J, pinion K, bevel-wheel L, set-collar $g$, and wheel $h$, all arranged to operate substantially as set forth.

In witness whereof I have hereunto signed my name in the presence of two subscribing witnesses.

ANDREW CAMPBELL.

Witnesses:
 HENRY CONNETT,
 ARTHUR C. FRASER.